(12) United States Patent
Kondo

(10) Patent No.: US 7,933,073 B2
(45) Date of Patent: Apr. 26, 2011

(54) ZOOM LENS

(75) Inventor: Yasuhiro Kondo, Nagoya (JP)

(73) Assignee: Elmo Company, Limited (JP)

( * ) Notice: Subject to any disclaimer, the term of this patent is extended or adjusted under 35 U.S.C. 154(b) by 156 days.

(21) Appl. No.: 12/163,312

(22) Filed: Jun. 27, 2008

(65) Prior Publication Data
US 2009/0002843 A1    Jan. 1, 2009

(30) Foreign Application Priority Data

Jun. 29, 2007    (JP) ................. 2007-171683

(51) Int. Cl.
  *G02B 15/14*    (2006.01)
(52) U.S. Cl. ............... 359/687; 359/683; 359/684
(58) Field of Classification Search .......... 359/687, 359/684, 685
  See application file for complete search history.

(56) References Cited

U.S. PATENT DOCUMENTS

| | | | |
|---|---|---|---|
| 5,872,658 A | 2/1999 | Ori | |
| 6,069,743 A | 5/2000 | Nagata et al. | |
| 6,931,207 B2 * | 8/2005 | Nanba | 396/72 |
| 7,535,654 B2 * | 5/2009 | Ohashi | 359/690 |
| 2003/0175021 A1 | 9/2003 | Hamano | |
| 2005/0270661 A1 * | 12/2005 | Nanba et al. | 359/676 |
| 2006/0193062 A1 * | 8/2006 | Ohashi | 359/689 |
| 2009/0040623 A1 * | 2/2009 | Morooka et al. | 359/687 |

FOREIGN PATENT DOCUMENTS

| | | |
|---|---|---|
| JP | 57-5012 | 1/1982 |
| JP | 58-30709 | 2/1983 |
| JP | 63-29718 | 6/1988 |
| JP | 3-215810 | 9/1991 |
| JP | 5-134178 | 5/1993 |
| JP | 6-194572 | 7/1994 |
| JP | 6-324265 | 11/1994 |
| JP | 8-50244 * | 2/1996 |
| JP | 2738099 | 1/1998 |
| JP | 2001-133687 | 5/2001 |
| JP | 3392881 | 1/2003 |

OTHER PUBLICATIONS

Office Action issued Oct. 10, 2008 in corresponding British Patent Application No. GB0811827.5.

* cited by examiner

*Primary Examiner* — Jordan M. Schwartz
(74) *Attorney, Agent, or Firm* — Ostrolenk Faber LLP

(57) ABSTRACT

In the zoom lens, the second lens group includes at least one surface that is an aspheric surface, and during changing magnification, the second lens group, the third lens group, and the fourth lens group are respectively capable of moving independently, with the position of the aperture moving along a convex trajectory on the optical axis from the image side to the object side during changing magnification. Through operation in this manner, the zoom lens of the invention is inexpensive and compact, and efficiently corrects various types of aberration. Thus, at a high magnification ratio of 5× or greater, the zoom lens of the invention affords a wide field exceeding approximately 78 degrees at the wide angle end, and affords a high performance compact zoom lens whose distortion is held to 3% or less.

7 Claims, 22 Drawing Sheets

Fig.3

LENS CONSTITUTION

| SURFACE NO. i | CURVATURE RADIUS Ri | SURFACE INTERVAL Di | REFRACTIVE INDEX Ndi | ABBE NUMBER υdi |
|---|---|---|---|---|
| 1 | 78.931 | 0.900 | 1.84666 | 23.8 |
| 2 | 28.213 | 3.893 | 1.72916 | 54.7 |
| 3 | 4721.5 | 0.100 | | |
| 4 | 18.939 | 3.196 | 1.72916 | 54.7 |
| 5 | 51.696 | VARIABLE | | |
| 6 | 55.408 | 0.900 | 1.83400 | 37.2 |
| 7 | 5.419 | 3.190 | | |
| 8* | -16.442 | 0.800 | 1.80610 | 40.9 |
| 9 | 16.172 | 1.006 | | |
| 10 | 20.000 | 2.306 | 1.84666 | 23.8 |
| 11 | -24.257 | VARIABLE | | |
| 12 | APERTURE | VARIABLE | | |
| 13* | 11.794 | 3.239 | 1.52996 | 55.8 |
| 14* | -30.044 | VARIABLE | | |
| 15 | 39.881 | 1.048 | 1.80809 | 22.8 |
| 16 | 7.087 | 4.459 | 1.69350 | 53.2 |
| 17* | -15.365 | 2.500 | | |
| 18 | ∞ | 4.000 | 1.51633 | 64.1 |
| 19 | ∞ | | | |

Fig.4

ASPHERIC SURFACE COEFFICIENT

| | CONIC CONSTANT (K) | 4th ORDER COEFFICIENT(A4) | 6th ORDER COEFFICIENT (A6) | 8th ORDER COEFFICIENT (A8) | 10th ORDER COEFFICIENT (A10) |
|---|---|---|---|---|---|
| S8 | −6.93339 | 9.09339E−05 | 1.38781E−07 | 2.88923E−07 | −4.88035E−09 |
| S13 | 0.086754 | 1.96823E−06 | 8.66023E−07 | −1.58197E−08 | 3.70436E−09 |
| S14 | −12.2633 | 1.31723E−04 | 6.26531E−06 | −3.26576E−07 | 1.05117E−08 |
| S17 | −1.96586 | 4.59210E−05 | −1.13621E−07 | 2.10838E−08 | −5.79187E−10 |

Fig.5

VARIABLE LENS INTERVAL

| SURFACE NO. | INTERVAL | WIDE ANGLE END | MIDDLE | TELEPHOTO END |
|---|---|---|---|---|
| 5 | D5 | 0.700 | 7.660 | 13.137 |
| 11 | D11 | 9.688 | 2.977 | 0.834 |
| 12 | D12 | 12.455 | 8.589 | 1.540 |
| 14 | D14 | 4.046 | 6.651 | 8.297 |

Fig.6

OPTICAL SPECIFICATIONS

| | WIDE ANGLE END | MIDDLE | TELEPHOTO END |
|---|---|---|---|
| FOCAL DISTANCE | 4.00 | 8.82 | 20.39 |
| FIELD ANGLE($2\omega$) | 78.0 | 39.6 | 17.6 |
| FNo. | 2.81 | 3.00 | 3.20 |

Fig.9
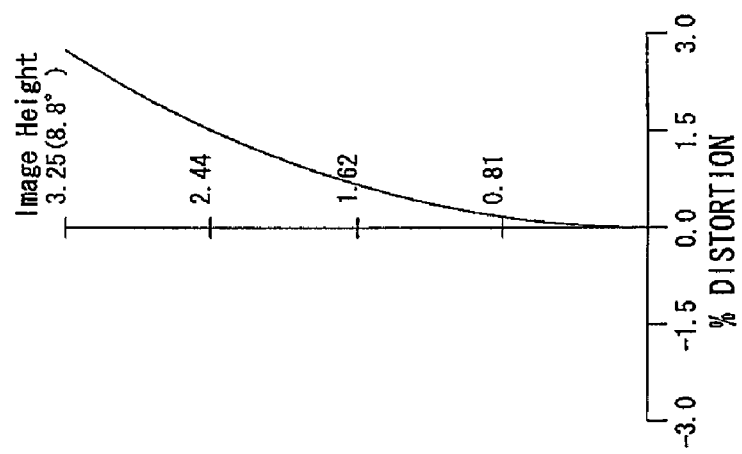
DISTORTION
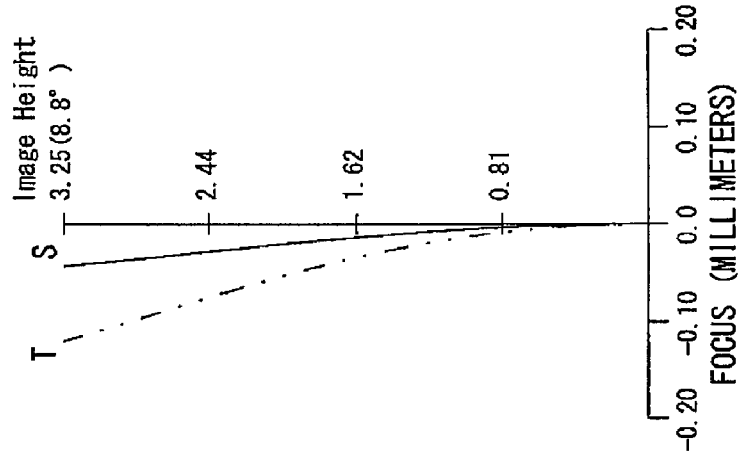
TELEPHOTO END
ASTIGMATISM
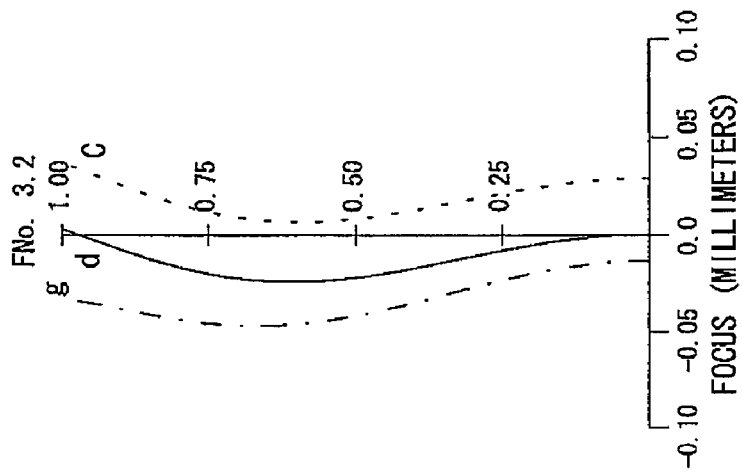
SPHERICAL ABERRATION

WIDE ANGLE END

Fig.11

LENS CONSTITUTION

| SURFACE NO. i | CURVATURE RADIUS Ri | SURFACE INTERVAL Di | REFRACTIVE INDEX Ndi | ABBE NUMBER νdi |
|---|---|---|---|---|
| 1 | 63.765 | 1.100 | 1.84666 | 23.8 |
| 2 | 19.278 | 2.024 | | |
| 3 | 36.033 | 2.919 | 1.74320 | 49.3 |
| 4 | 519.13 | 0.100 | | |
| 5 | 17.528 | 4.512 | 1.74100 | 52.7 |
| 6 | −4893.5 | VARIABLE | | |
| 7 | 289.61 | 0.900 | 1.77250 | 49.6 |
| 8 | 5.431 | 2.550 | | |
| 9* | 382.79 | 1.000 | 1.80610 | 40.9 |
| 10* | 9.134 | 1.040 | | |
| 11 | 12.597 | 1.964 | 1.84666 | 23.8 |
| 12 | −107.53 | VARIABLE | | |
| 13 | APERTURE | VARIABLE | | |
| 14* | 13.080 | 2.858 | 1.52996 | 55.8 |
| 15* | −17.952 | VARIABLE | | |
| 16 | 36.599 | 0.80 | 1.92286 | 18.9 |
| 17 | 8.795 | 4.000 | 1.69350 | 53.2 |
| 18* | −14.613 | 2.500 | | |
| 19 | ∞ | 4.000 | 1.51633 | 64.1 |
| 20 | ∞ | | | |

Fig.12

ASPHERIC SURFACE COEFFICIENT

| | CONIC CONSTANT(K) | 4th ORDER COEFFICIENT(A4) | 6th ORDER COEFFICIENT (A6) | 8th ORDER COEFFICIENT (A8) | 10th ORDER COEFFICIENT (A10) |
|---|---|---|---|---|---|
| S9 | −.46911 | 2.36352E−04 | 4.84150E−06 | −4.22225E−07 | −8.22643E−09 |
| S10 | −2.48280 | 1.03629E−04 | 1.79793E−05 | −2.28743E−06 | 3.51471E−08 |
| S14 | −1.99276 | −7.28257E−05 | 2.12712E−06 | −2.73449E−08 | −3.29182E−10 |
| S15 | −1.28160 | 2.89421E−05 | 1.42334E−07 | 2.99555E−09 | −3.87281E−10 |
| S18 | −6.85631 | −1.16025E−04 | 1.33571E−06 | 3.36783E−08 | −1.18781E−09 |

Fig.13

VARIABLE LENS INTERVAL

| SURFACE NO. | INTERVAL | WIDE ANGLE END | MIDDLE | TELEPHOTO END |
|---|---|---|---|---|
| 6 | D6 | 0.600 | 7.576 | 12.959 |
| 12 | D12 | 9.764 | 3.957 | 1.600 |
| 13 | D13 | 10.989 | 6.663 | 0.700 |
| 15 | D15 | 4.567 | 6.803 | 8.266 |

Fig.14

OPTICAL SPECIFICATIONS

| | WIDE ANGLE END | MIDDLE | TELEPHOTO END |
|---|---|---|---|
| FOCAL DISTANCE | 3.90 | 8.78 | 20.07 |
| FIELD ANGLE(2ω) | 80.6 | 39.8 | 18.0 |
| FNo. | 2.81 | 3.02 | 3.19 |

Fig.15
WIDE ANGLE END
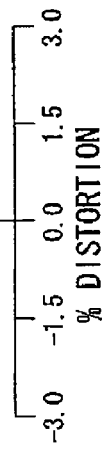
DISTORTION
ASTIGMATISM
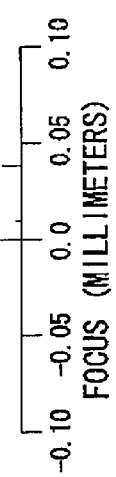
SPHERICAL ABERRATION Fig.16
MIDDLE
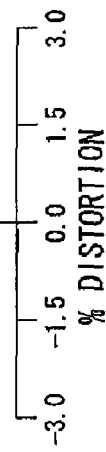
DISTORTION
ASTIGMATISM
SPHERICAL ABERRATION Fig.17
TELEPHOTO END
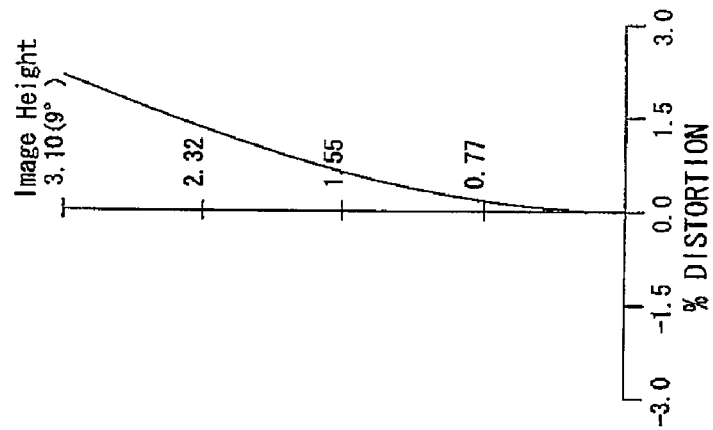
DISTORTION
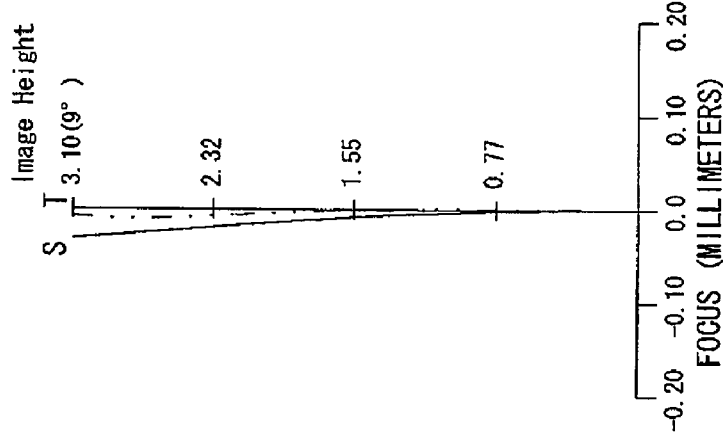
ASTIGMATISM
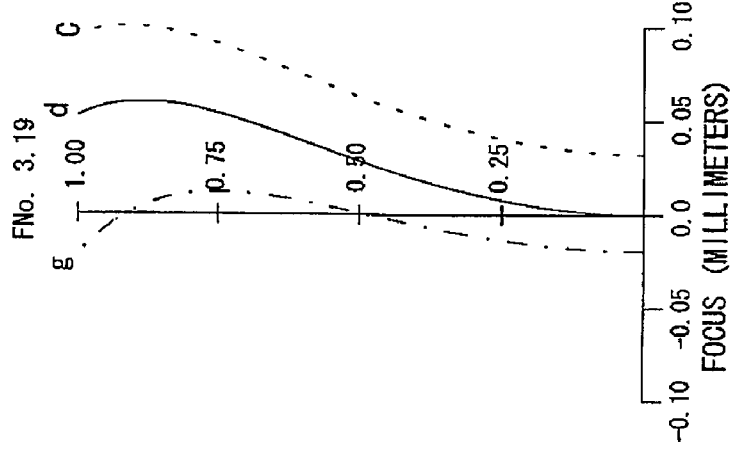
SPHERICAL ABERRATION

Fig.19

LENS CONSTITUTION

| SURFACE NO. i | CURVATURE RADIUS Ri | SURFACE INTERVAL Di | REFRACTIVE INDEX Ndi | ABBE NUMBER $\nu$ di |
|---|---|---|---|---|
| 1 | 56.590 | 3.829 | 1.72916 | 54.7 |
| 2 | -68.594 | 0.900 | 1.84666 | 23.8 |
| 3 | 207.75 | 0.100 | | |
| 4 | 21.452 | 3.082 | 1.75500 | 52.3 |
| 5 | 58.312 | VARIABLE | | |
| 6 | 68.456 | 0.900 | 1.80610 | 40.9 |
| 7* | 5.668 | 3.362 | | |
| 8 | -15.964 | 0.800 | 1.80100 | 35.0 |
| 9 | 16.506 | 1.044 | | |
| 10 | 18.308 | 2.097 | 1.84666 | 23.8 |
| 11 | -27.103 | VARIABLE | | |
| 12 | APERTURE | VARIABLE | | |
| 13* | 11.786 | 3.072 | 1.52996 | 55.8 |
| 14* | -28.816 | VARIABLE | | |
| 15 | 47.792 | 0.800 | 1.84666 | 23.8 |
| 16 | 7.324 | 5.004 | 1.69350 | 53.2 |
| 17* | -12.490 | 2.500 | | |
| 18 | ∞ | 4.000 | 1.51633 | 64.1 |
| 19 | ∞ | | | |

Fig.20

ASPHERIC SURFACE COEFFICIENT

| | CONIC CONSTANT(K) | 4th ORDER COEFFICIENT(A4) | 6th ORDER COEFFICIENT (A6) | 8th ORDER COEFFICIENT (A8) | 10th ORDER COEFFICIENT (A10) |
|---|---|---|---|---|---|
| S7 | -0.083963 | -2.08431E-04 | 2.19627E-06 | -5.67599E-07 | 7.65273E-10 |
| S13 | 0.062211 | 4.25545E-06 | 3.83848E-07 | -2.29152E-08 | 3.80141E-09 |
| S14 | -14.1549 | 1.38215E-04 | 6.31016E-06 | -3.34784E-07 | 1.01432E-08 |
| S17 | -1.68903 | 3.64416E-05 | -1.11774E-07 | -4.94240E-09 | -3.11028E-10 |

Fig.21

VARIABLE LENS INTERVAL

| SURFACE NO. | INTERVAL | WIDE ANGLE END | MIDDLE | TELEPHOTO END |
|---|---|---|---|---|
| 5 | D5 | 0.700 | 8.058 | 14.498 |
| 11 | D11 | 10.121 | 1.476 | 0.700 |
| 12 | D12 | 11.868 | 9.354 | 1.600 |
| 14 | D14 | 3.716 | 6.623 | 7.266 |

Fig.22

OPTICAL SPECIFICATIONS

| | WIDE ANGLE END | MIDDLE | TELEPHOTO END |
|---|---|---|---|
| FOCAL DISTANCE | 4.01 | 9.01 | 20.53 |
| FIELD ANGLE($2\omega$) | 78.4 | 38.2 | 17.2 |
| FNo. | 2.82 | 3.03 | 3.21 |

ZOOM LENS

CROSS REFERENCE TO RELATED APPLICATIONS

The present application claims the priority based on Japanese Patent Applications No. 2007-171683 filed on Jun. 29, 2007, the disclosures of which are hereby incorporated by reference in its entirety.

BACKGROUND

1. Technical Field

This invention relates to a zoom lens that employs aspheric lenses.

2. Related Art

In the imaging device of a video camera or the like, a zoom lens with a wide field angle is commonly used. In the past, many zoom lenses of this type had a four-group constitution with refractive power that is positive, negative, positive, and positive, in order from the object side. In a four-group constitution zoom lens, with the first lens group and the third lens group fixed, the second lens group is moved in the optical axis direction to change the magnification (zoom); and the fourth lens group is moved to correct variation of the image surface that occurs with displacement and is moved in the optical axis direction to focus. This so-called four-group focus zoom method is currently the most common one.

Various types of zoom lenses of this kind have been proposed. For example, it has been attempted to make a wider angle and to suppress distortion by using a four-lens constitution for the first lens group, and by making the aperture independently movable.

SUMMARY

However, with the conventional lens constitution, it is not possible to widen the angle to the angle exceeding 60 degrees, because the field angle of the screen diagonal line for the wide angle end is at most about 60 degrees. Also, the first lens group has four lenses, so there is the problem of the zoom lens becoming bulky.

With the foregoing in view, it is an object of the present invention to achieve smaller size, wider angle, and lower aberration in a four-group constitution zoom lens with a refractive power arrangement that is positive, negative, positive, and positive in order from the object side.

The present invention provides at least a partial solution to the problems described above.

An aspect of the present invention provides a zoom lens, the zoom lens includes a first lens group that is arranged at the farthest object side and has positive refractive power; a second lens group that is arranged at an image side of the first lens group and has negative refractive power and includes at least one aspheric surface; an aperture that is arranged at the image side of the second lens group; a third lens group that is arranged at the image side of the aperture and has positive refractive power; a fourth lens group that is arranged at the farthest image side and has positive refractive power for focusing; and a variable power mechanism that moves the second lens group, the third lens group, the aperture, and the fourth lens group respectively and independently during changing magnification.

With the zoom lens of the aspect of the present invention, by also moving the third lens group during changing magnification, it is possible to give the third lens group a variable power action as well. Thus, it is possible to weaken the refractive power of the first lens group and the second lens group which are mainly responsible for the variable power action. Therefore, it is possible to correct aberration efficiently. Also, with the zoom lens of the aspect of the present invention, because an aspheric surface is included in the second lens group, it is possible to suppress various types of aberration by than that an aspheric surface is included in the first lens group, as well as to make the zoom lens more compact. Thus, it is possible for the zoom lens of the aspect of the present invention to be more compact and have a wider angle.

These and other objects, features, aspects, and advantages of the invention will become more apparent from the following detailed description of the preferred embodiments with the accompanying drawings.

BRIEF DESCRIPTION OF THE DRAWINGS

FIG. 3 shows surface data of lenses constituting the zoom lens 100 of first embodiment.

FIG. 4 shows values of the aspheric surface coefficient in first embodiment.

FIG. 5 shows values of surface intervals for surfaces that move during changing magnification from the wide angle end to the telephoto end in first embodiment.

FIG. 6 shows optical specifications in first embodiment.

FIG. 9 shows the aberration characteristics at the telephoto end in first embodiment.

FIG. 11 shows surface data for lenses constituting the zoom lens 100B in second embodiment.

FIG. 12 shows aspheric surface coefficients of the aspheric surfaces in second embodiment.

FIG. 13 shows surface intervals for surfaces that move when magnification changes from the wide angle end to the telephoto end in second embodiment.

FIG. 14 shows the optical specifications in second embodiment.

FIG. 15 shows aberration characteristics at the wide angle end in second embodiment.

FIG. 16 shows the aberration characteristics at middle position between the wide angle end and the telephoto end in second embodiment.

FIG. 17 shows aberration characteristics with the telephoto end in second embodiment.

FIG. 19 shows surface data for lenses constituting the zoom lens 100C in third embodiment.

FIG. 20 shows the aspheric surface coefficients of the aspheric surfaces in third embodiment.

FIG. 21 shows surface intervals for the surfaces that move when magnification changes from the wide angle end to the telephoto end in third embodiment.

FIG. 22 shows the optical characteristics in third embodiment.

DESCRIPTION OF THE PREFERRED EMBODIMENT

A. First Embodiment

Figure 1:
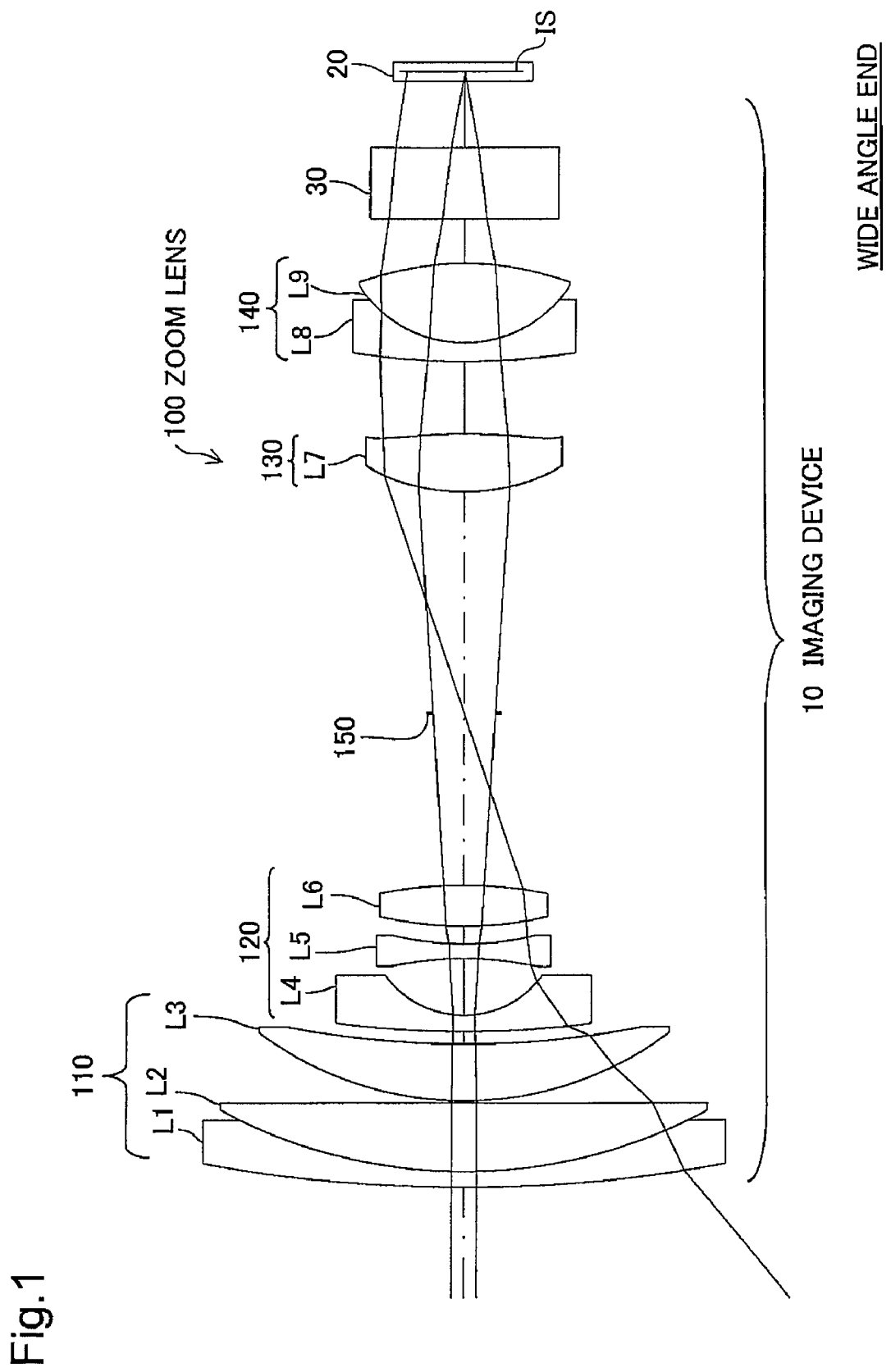
FIG. 1 shows the main parts of the imaging device 10 for first embodiment.

A-1. Zoom Lens Constitution:

FIG. 1 shows the main parts of an imaging device 10 of first embodiment. As shown in FIG. 1, the imaging device 10 is equipped with a zoom lens 100, a solid-state image sensing device 20 such as a CCD (charge coupled device) or the like which converts images taken by the zoom lens 100 to electric image signals, and an optical component 30 provided between the zoom lens 100 and the solid-state image sensing device 20. The optical component 30, for example, contains an optical filter, a solid state imaging component cover glass and the like. The solid-state image sensing device 20 has an image surface (imaging surface) IS.

The zoom lens 100 includes, in order from the object side, a first lens group 110 having an overall positive refractive power, a second lens group 120 having an overall negative refractive power that moves on the optical axis during changing magnification, a third lens group 130 having an overall positive refractive power, and a fourth lens group 140 having an overall positive refractive power that moves on the optical axis to correct the image surface position. The first lens group 110 is fixed. An aperture 150 is provided between the second lens group 120 and the third lens group 130. By virtue of this constitution, the zoom lens 100 is a four-group, inner focus zoom type zoom lens. Zoom lens 100 has a variable power mechanism which changes magnification of zoom lens 100, moving the second lens group 120, the third lens group 130, the fourth lens group 140, and the aperture 150. A variable power mechanism is omitted in FIG. 1.

FIG. 1 shows the positional relationship of each lens group at the wide angle end, and during changing magnification to the telephoto end, the second lens group 120 moves monotonically along the optical axis from the object side towards the image side. The first lens group 110 is fixed. The third lens group 130 and the fourth lens group 140 move along the optical axis during changing magnification to the telephoto end. The fourth lens group focuses.

The first lens group 110 is constituted by three lenses. The first lens L1 which is arranged at the farthest object side is a negative meniscus lens (a meniscus lens having a negative refractive power), and the other second and third lenses L2 and L3 are positive lenses. The second lenses L2 which is secondly arranged when viewed from the object side, and the third lenses L3 which is secondly arranged when viewed from the object side, are oriented with their convex surfaces facing towards the object side. The first lens L1 and the second lens L2 are cemented together to constitute a cemented lens. The direction of orientation of the convex surface of the second and third lenses L2, L3 do not have to be as noted above, and an arrangement in which a strong convex surface faces in the opposite direction noted above would be possible. Also, in this embodiment, the first lens L1 is described as a negative meniscus lens, but it need not necessarily be a negative meniscus lens, and could be replaced by any of various other lenses having a negative refractive power (negative lens).

The second lens group 120 is constituted by three lenses. The fourth lens L4 is arranged at the farthest object side, and is a negative meniscus lens whose convex surface faces towards the object side and whose concave surface faces towards the image side. The fifth lens L5 is a biconcave lens formed with the object side surface in an aspheric surface shape. The sixth lens L6 arranged at the farthest image side is a biconvex lens. Note that the fifth lens L5 and the sixth lens L6 need not necessarily be constituted separately, they can also be cemented together. Note that with the second lens group 120, the object side surface of the fifth lens L5 need not necessarily be aspheric, and it is acceptable for at least one surface among the surfaces contained in the second lens group 120 to be an aspheric surface.

The third lens group 130 is constituted by a single lens. The seventh lens L7 as the single lens is a biconvex lens with both surfaces of the object side and the image side being formed in an aspheric surface shape. It is not essential for both surfaces of the seventh lens L7 to be aspheric surfaces; it is also possible for only one surface to be an aspheric surface.

The fourth lens group 140 is constituted by two lenses. The eighth lens L8 arranged at the farthest object side is a negative meniscus lens with the convex surface facing the object side and the concave surface facing the image side. The ninth lens L9, which is also the final lens, arranged at the farthest image side (final lens for the overall zoom lens 100) is a biconvex lens whose image side surface is formed with an aspheric surface. The eighth lens L8 and the ninth lens L9 are cemented together to constitute a cemented lens. It is not essential that the eighth lens L8 and the ninth lens L9 be cemented together; a constitution having a gap between L8 and L9 is possible as well.

Figure 2:
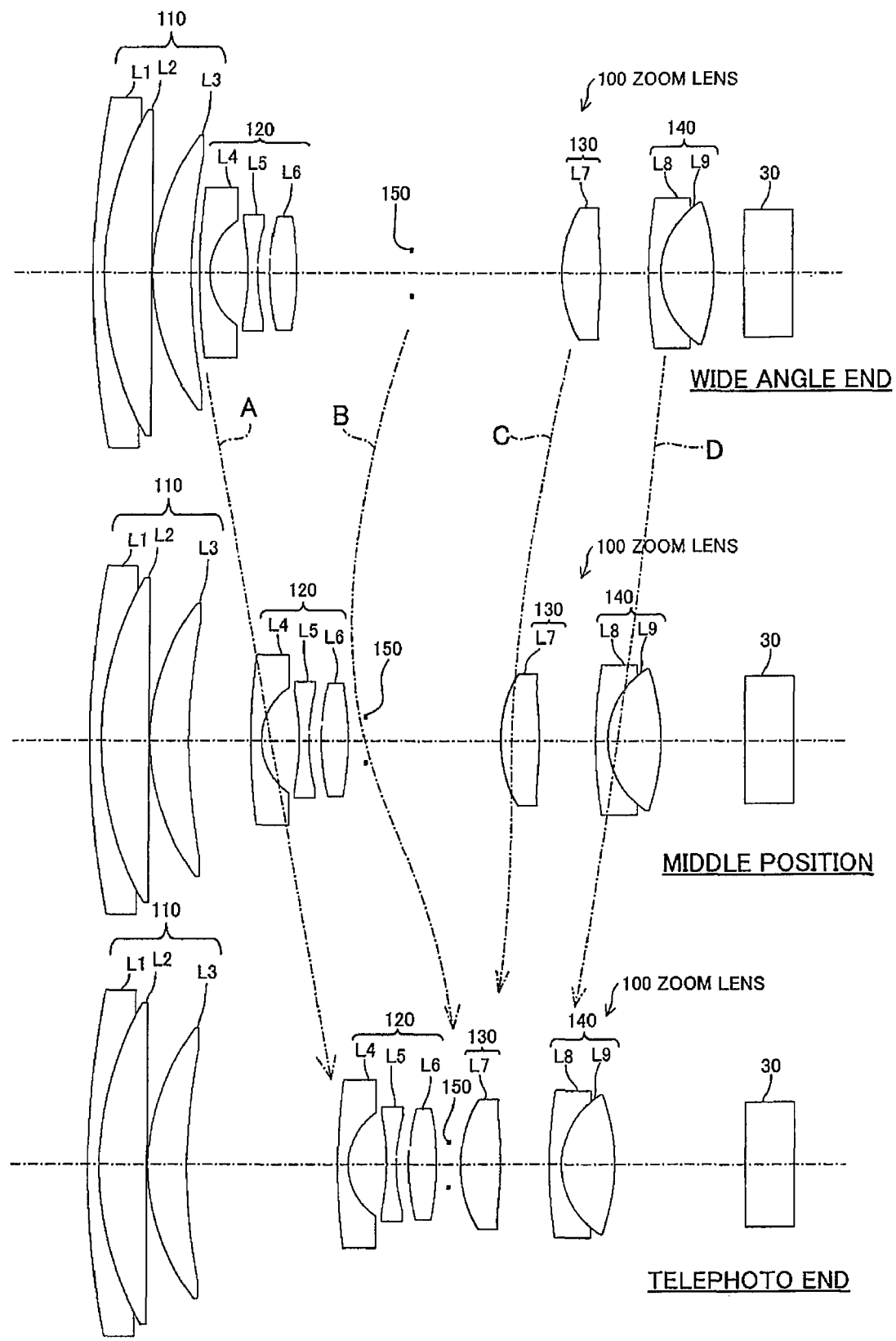
FIG. 2 shows an example of the trajectory of movement on the optical axis by a second lens group, a third lens group, a fourth lens group, and an aperture during changing magnification from the wide angle end to the telephoto end in first embodiment.

FIG. 2 shows an example of the moving trajectory on the optical axis of the second lens group, the third lens group, the fourth lens group, and the aperture during changing magnification from the wide angle end to the telephoto end in the first embodiment. In this way, the zoom lens 100 performs magnification change between the wide angle end and the telephoto end by changing the positional relationship of the lens groups.

In FIG. 2, the trajectory A represents the trajectory of the second lens group 120. The trajectory B represents the trajectory of the aperture 150. The trajectory C represents the trajectory of the third lens group 130. The trajectory D represents the trajectory of the fourth lens group 140.

As shown by the trajectory B, the aperture 150, after moving from the image side to the object side, moves from the object side to the image side. Specifically, it moves with a convex trajectory. By working in this way, at the wide angle end, it is possible to suppress an increase in the diameter of the third lens group 130 and the fourth lens group 140. It is also possible to suppress the light ray height of the first lens group 110 when displaced slightly from the wide angle end to the telephoto side. Because of this, it is possible to suppress high order positive distortion, and it is possible to suppress an increase in the diameter of the first lens group 110.

With the zoom lens 100 of the first embodiment constituted as described above, where at least one aspheric surface is included in the second lens group 120, in it is possible to reduce the aspheric surface lens diameter as compared to where an aspheric surface is used in the first lens group 110. Typically, for distortion correction at the wide angle end only, using the aspheric surface of the first lens group 110 for which the height of the main light ray is the highest will be effective. However, with a wide angle zoom, the diameter of the first lens group 110 tends to become large, leading to an increase in the manufacturing cost of the aspheric surface and making the size of the zoom lens bigger. Thus, by using an aspheric surface for the second lens group 120, it is possible to constitute the first lens group 110 with three lenses, and to achieve lower cost and more compact size. Also, when an aspheric surface is used for the first lens group 110, at the telephoto end, the light ray height of the marginal light rays will be highest with the first lens group 110, so there will be a big aftermath on the correction of spherical aberrations at the telephoto end, and any aspheric surface manufacturing error will have a big effect on the performance at the telephoto end. Thus, by using an aspheric surface for the second lens group 120, it is possible to efficiently correct various types of aberrations that occur with various types of zooms.

Also, by making the third lens group 130 independently movable, it is possible for the third lens group 130 to have magnification changing action. As a result, it is possible to weaken the refractive power of the first lens group 110 and the second lens group 120 which are primarily responsible for magnification change. Therefore, it is possible to easily correct various types of aberration. In particular, when a wide angle lens for which the field angle exceeds 65 degrees is produced, the variation in the light ray height of the first lens group 110 will increase with magnification change, as a result, the variation of the distortion increase. When distortion at the wide angle end is reduced, the light ray height of the first lens group 110 will be high if there is slight magnification change from the wide angle end to the telephoto side, and high order positive distortion will be appreciable. Thus, by making the third lens group 130 independently movable, it is possible to efficiently suppress distortion and to easily perform widening of the angle.

Also, by moving the position of the aperture 150 such that the projection (convex) trajectory on the optical axis moves from the image side to the object side during changing magnification, it is possible to avoid an increase in the diameter of the third lens group 130 and the fourth lens group 140 at the wide angle end. It is also possible to reduce the light ray height of the first lens group 110 during slight magnification change from the wide angle end to the telephoto side. Thus, it is possible to reduce high order positive distortion and to avoid an increase in the diameter of the first lens group 110.

A-2. Lens Data:

FIG. 3 shows surface data for each lens constituting the zoom lens 100 of the first embodiment. The surface number i indicates the number of the surface (lens surface) of each lens constituting the zoom lens 100. However, the surface number 12 indicates the aperture 150, and the surface numbers 18 and 19 indicate the optical component 30. The curvature radius Ri indicates the curvature radius (mm) of the surface Si. The curvature radius of a convex surface on the object side is represented by a positive value, and the curvature radius of a concave surface on the object side is represented by a negative value.

The surface interval Di indicates the distance (mm) on the optical axis between the surface Si and the surface Si+1. Specifically, where the surface number i indicates the lens object side surface, the surface interval Di represents the thickness of the lens on the optical axis; and where the surface number i indicates the lens image side surface, the surface interval Di represents the distance on the optical axis between the image side surface of the lens and a subsequent stage optical component (e.g. a lens) object side surface.

The refractive index Ndi indicates the refractive index in relation to the d ray (wavelength 587.6 nm) of the lens having the surface Si.

The Abbe number vdi indicates the Abbe number of the lens having the surface Si. Note that the Abbe number vdi is a value representing the properties relating to light dispersion of the lens or the like; where the refractive index in relation to the d rays, C rays (wavelength 656.3 nm) and the F rays (wavelength 486.1 nm) are nd, nC, and nF, Abbe number vd will be represented by (nd−1)/(nF−nC).

In the first embodiment, the third lens group 130 and the fourth lens group 140 are constituted by a total of three lenses, i.e. one negative lens (the eighth lens L8 included in the fourth lens group 140) and two positive lenses. The negative lens L8 has a refractive index Nd15=1.80809 and an Abbe number v d15=22.8 as shown in FIG. 3. When a negative lens is included in the fourth lens group 140, this negative lens is preferably constituted such that the refractive index nd=1.8 or greater and the Abbe number v d=25 or less, and more preferably such that the refractive index nd=1.9 or greater and the Abbe number v d=20 or less.

In FIG. 3, the surface marked by an asterisk "*" on the surface number i has an aspheric surface shape. As described previously, in this embodiment, the fifth lens L5 image side surface S8, the seventh lens L7 object side surface S13 and image side surface S14, and the ninth lens L9 image side surface 17 has an aspheric surface shape. The aspheric surface shape is represented by the following formula.

Formula 1

$$X = \frac{\frac{H^2}{R}}{1 + \sqrt{\left(1 - (1+K) \cdot \left(\frac{H}{R}\right)^2\right)}} + A4 \cdot H^4 \cdot A6 \cdot H^6 + A8 \cdot H^8 + A10 \cdot H^{10}$$

Here, where the intersection of the aspheric surface and the optical axis is designated as the origin point, H represents the distance (height from the optical axis) from the origin point in a direction perpendicular to the optical axis. X represents the distance on the optical axis from that origin point. R represents the curvature radius; K represents the conic coefficient; and A4, A6, A8, and A10 represent the high order aspheric coefficients. Note that the curvature radius R can be set as appropriate.

FIG. 4 shows values of the aspheric surface coefficient in the first embodiment. FIG. 4 shows the aspheric surface coefficients of each aspheric surface (surface S8, surface S13, surface S14, and surface S17). The value of the conic constant K, and values of the high order aspheric surface coefficients (aspheric surface coefficients of the 4th order, 6th order, 8th order, and 10th order) A4, A6, A8, and A10 are shown as aspheric surface coefficients.

FIG. 5 shows each value of the surface interval of moving surface that moves from the wide angle end to the telephoto end during changing magnification with the first embodiment. In the first embodiment, the surface numbers 5, 11, 12 and 14 indicate the moving surfaces, and FIG. 5 shows the values of the surface intervals D5, D11, D12, D14. As shown in FIG. 5, by setting the surface interval D5 correlating to the distance on the optical axis between the first lens group 110 and the second lens group 120 to 0.700, setting the surface interval D1 correlating to the distance on the optical axis between the second lens group 120 and the aperture 150 to 9.688, setting the surface interval D12 correlating to the distance on the optical axis between the aperture 150 and the third lens group 130 to 12.455, and setting the distance between the third lens group 130 and the fourth lens group 140 to 4.046, it is possible to place the zoom lens 100 in the wide angle state. Similarly, by setting the surface intervals D5, D11, D12, and D14 the values shown in FIG. 5, it is possible to place the zoom lens 100 in a middle state between the wide angle end and the telephoto end, or to place it in the telephoto end state.

FIG. 6 shows the optical specifications for the first embodiment. As shown in FIG. 6, at the wide angle end, the focal distance=4.00, the field angle 2ω=78.0 degrees, and the F number=2.81; at the middle position, the focal distance=8.82, the field angle 2ω=39.6 degrees, and the F number=3.00; and at the telephoto end, the focal distance=20.39, the field angle 2ω=17.6 degrees, and the F number=3.20. In this way, in the zoom lens 100 of the first embodiment it is possible to provide a wide field angle of field angle 78.0 degrees, at the wide angle end.

Figure 7:
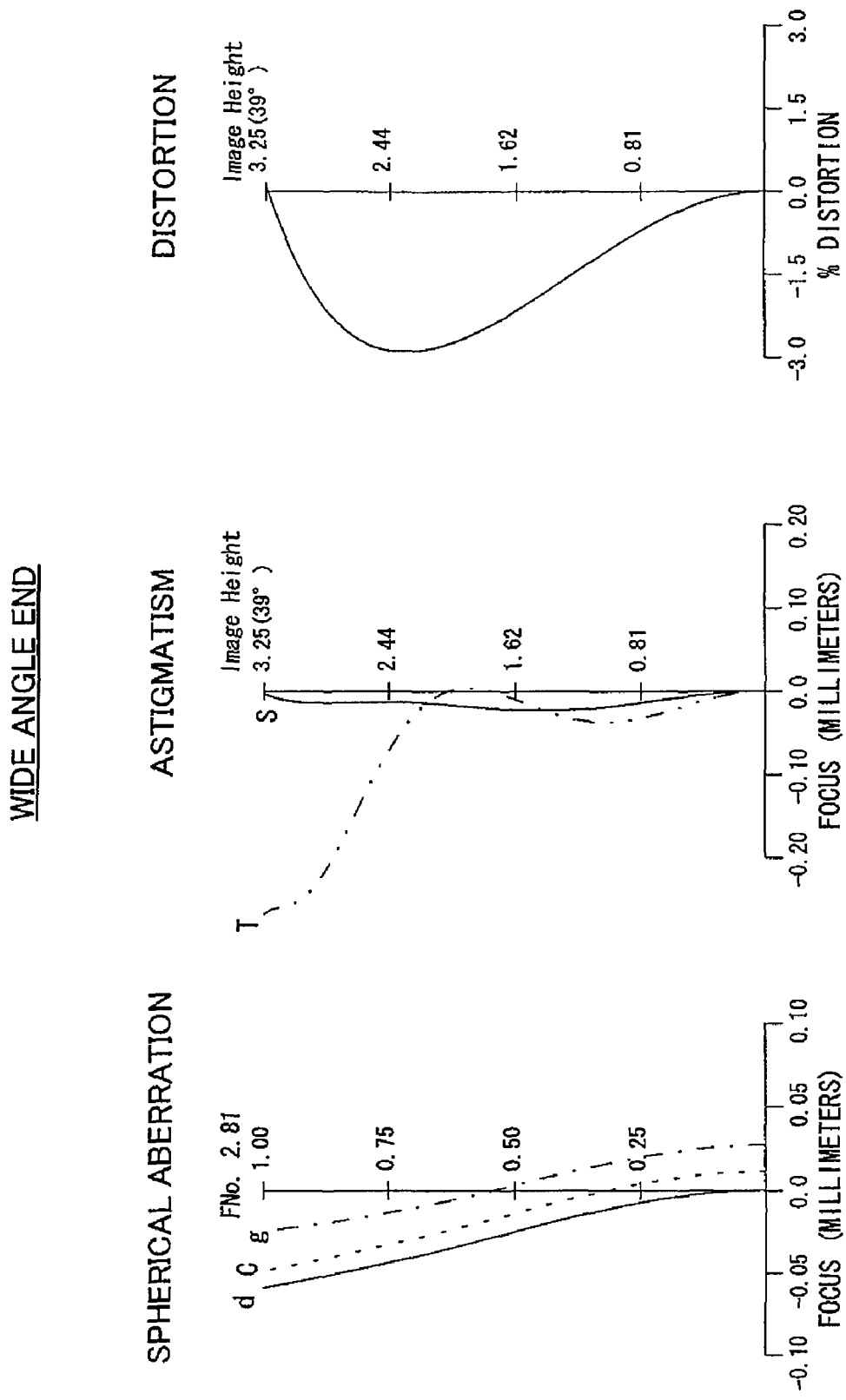
FIG. 7 shows aberration characteristics with the wide angle end in first embodiment.
Figure 8:
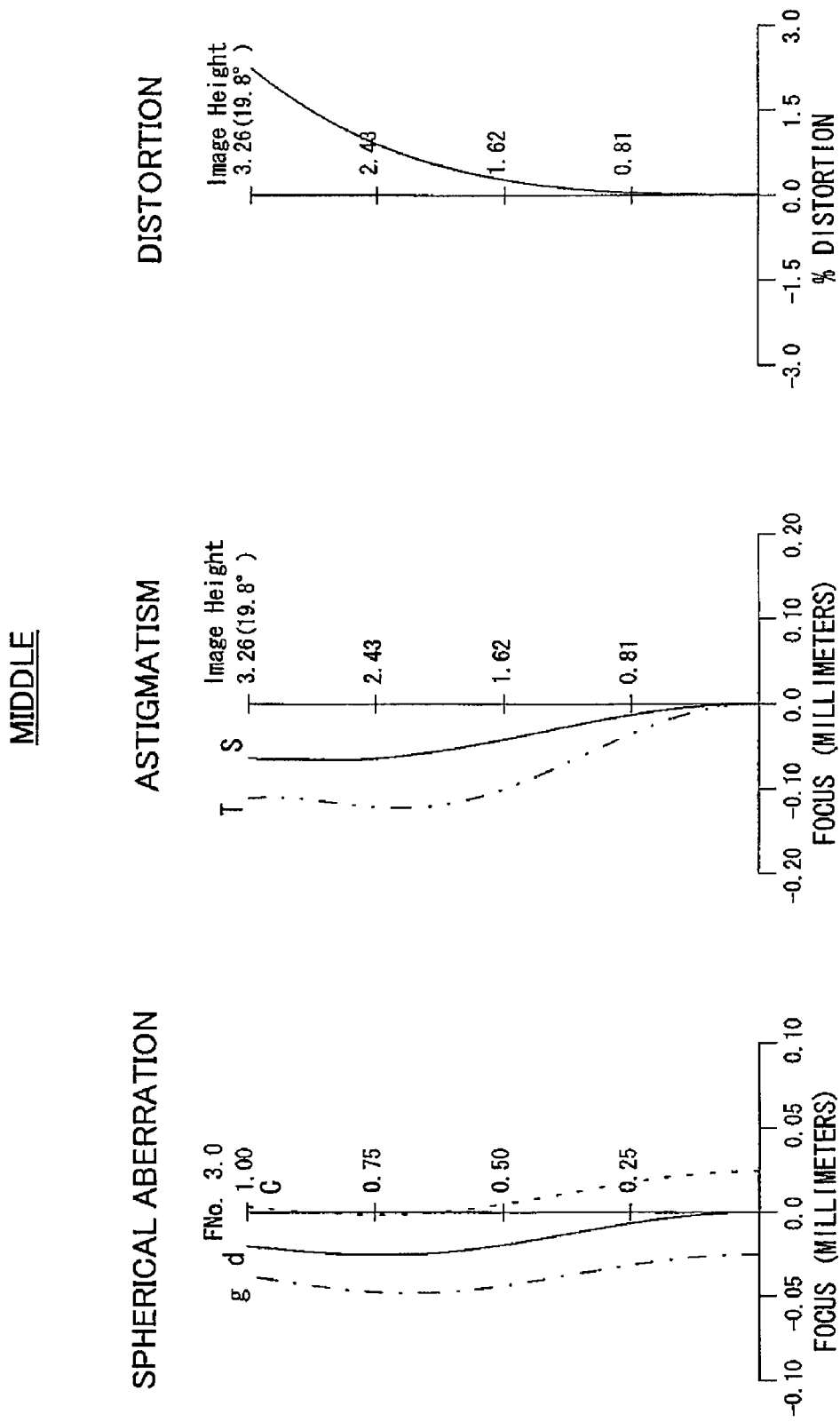
FIG. 8 shows aberration characteristics at middle position between the wide angle end and the telephoto end in first embodiment.

A-3. Zoom Lens Characteristics:

FIG. 7 through FIG. 9 show aberration characteristics of the zoom lens 100 in the first embodiment constituted as described above. FIG. 7 shows aberration characteristics at the wide angle end in the first embodiment. FIG. 8 shows aberration characteristics at a middle position between the wide angle end and the telephoto end in the first embodiment. FIG. 9 shows aberration characteristics at the telephoto end in the first embodiment. In FIG. 7 to FIG. 9, the graph at left shows the amount of the spherical aberration in relation to the F number, the middle graph shows the amount of the astigmatism in relation to the height direction of the imaging surface, and the graph at right shows the amount of distortion in relation to the height direction of the imaging surface. The symbols C, d, and g in the graph indicating the spherical aberration of FIG. 7 represent differences in the light ray wavelengths used to derive the aberrations (C ray: Wavelength 656.3 nm, d ray: 587.6 nm, g ray: 435.8 nm); symbol T in the graph which represents the astigmatism of FIG. 7 indicates that the characteristics pertain to a tangential light ray; and S shows that characteristics pertain to a sagittal light ray. This convention is used for FIG. 8 and FIG. 9 as well. FIG. 7 through FIG. 9 are simulation results.

As shown in FIG. 7 to FIG. 9, at a high magnification ratio of 5× or greater the zoom lens 100 of the first embodiment affords at the wide angle end and the telephoto end respectively significant improvement in spherical aberration, astigmatism, and distortion as compared with the aberration characteristics of a conventional zoom lens. In particular, distortion is approximately 3% or less, and is reduced to the point that distortion is virtually undetectable by the user. Therefore, it is possible to capture a high quality image throughout the entire field angle.

In the zoom lens 100 of the first embodiment described above, at a high magnification ratio of 5× or greater, it is possible to achieve a wide field angle exceeding approximately 78 degrees at the wide angle end, as well as to provide a compact zoom lens with high performance and distortion of 3% or less.

B. Second Embodiment

Figure 10:
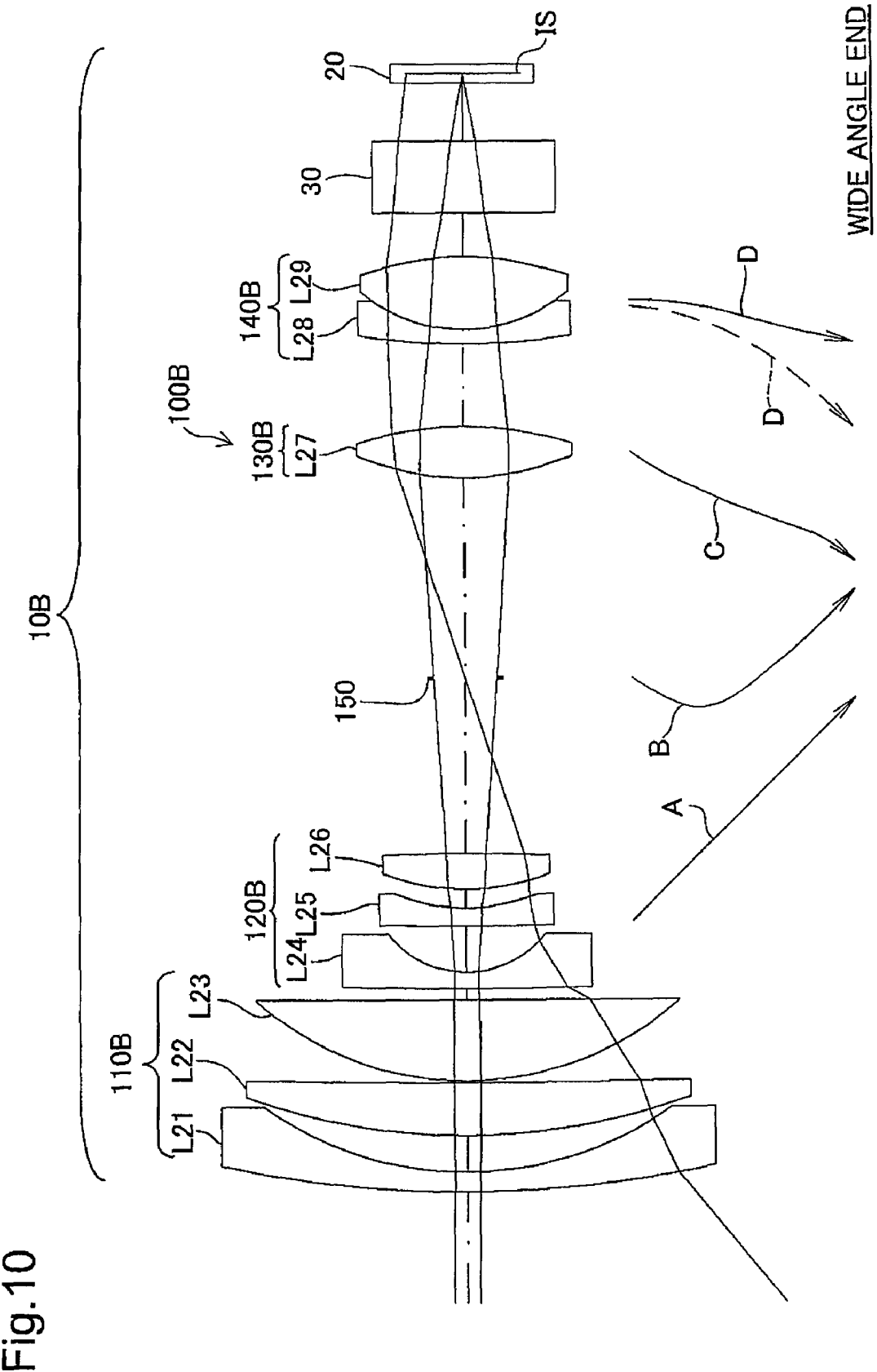
FIG. 10 shows the principal parts of the imaging device 10B in second embodiment.

B-1. Zoom Lens Constitution:

FIG. 10 shows the main parts of the imaging device 10B in the second embodiment. The imaging device 10B has almost the same constitution as the imaging device 10 of the first embodiment, except for the constitution of the zoom lens 100B.

The zoom lens 100B includes, in order from the object side, a first lens group 110B having an overall positive refractive power; a second lens group 120B having an overall negative refractive power and that moves on the optical axis during changing magnification; a third lens group 130B having an overall positive refractive power and that moves on the optical axis during changing magnification; a fourth lens group 140B having an overall positive refractive power and that moves on the optical axis to correct the image surface position; and an aperture 150 that moves in a convex trajectory on the optical axis during changing magnification. The first lens group 110 is fixed.

The first lens group 110B has almost the same constitution as the first lens group 110 of the first embodiment. Specifically, the first lens group 110B of the embodiment 2 is constituted by three lenses L21, L22, and L23 which have substantially identical constitution as and face in the same respective directions as the first through third lenses L1, L2, and L3 of the first embodiment. Here, substantially identical constitution means that the lens types of the positive lens, negative lens, meniscus lens and the like are the same, with only the numerical value data (lens data) indicating the lens thickness and the like being different (this applies hereinbelow as well).

The second lens group 120B is constituted by three lenses. The fourth lens L24 arranged at the furthest object side is a negative lens with the concave surface facing the image side. The fifth lens L25, which is the second lens when viewed from the object side, has both surfaces formed with aspherical shape, and is a negative meniscus lens whose concave surface faces towards the image side. The sixth lens L26 situated at the farthest image side is a biconvex lens.

The third lens group 130B is constituted by a single lens. The seventh lens L27 as the single lens is a biconvex lens with both surfaces formed in an aspheric surface shape.

The fourth lens group 140B has substantially identical constitution to the fourth lens group 140 of the first embodiment. Specifically, the fourth lens group 140B is constituted by two lenses. The eighth lens L28 situated furthest towards the object side is a negative meniscus lens whose convex surface faces towards the object side and whose concave surface faces towards the image side. The ninth lens L29, which is the final lens (final lens of the overall zoom lens 100B) situated furthest towards the image side, is a biconvex lens whose image side surface is formed with an aspherical shape. The eighth lens L28 and the ninth lens L29 are cemented together to constitute a cemented lens.

The trajectories of motion of the second lens group 120B, the aperture 150, the third lens group 130B, and the fourth lens group 140B during changing magnification are denoted respectively as trajectories A, B, C, and D in FIG. 10. As shown by the trajectory B, the aperture 150, after moving from the image side to the object side, moves from the object side to the image side. The trajectory D shown by the solid line represents the trajectory during focus at infinity, while the trajectory D shown by the dotted line represents the trajectory during focus on an object at near distance. This conventional will be used hereinbelow.

Also, as shown by the trajectory C, the third lens group 130B moves along the optical axis independently during changing magnification.

B-2. Lens Data:

FIG. 11 shows surface data for each lens constituting the zoom lens 100B of the second embodiment. FIG. 11 corresponds to FIG. 3 illustrating the first embodiment. In this embodiment, both of the surfaces S9 and S10 of the fifth lens L25, both of the surfaces S14 and S15 of the seventh lens L27, and the image side surface S18 of the ninth lens L29 are formed with aspheric surface shape. FIG. 12 shows the aspheric surface coefficient of the surfaces S9, S10, S14, S15, and S18 of the second embodiment. FIG. 12 corresponds to FIG. 4 illustrating the first embodiment. FIG. 13 shows values of surface intervals D6, D12, D13, and D15 for the surfaces (the surfaces with the surface number 6, 12, 13, and 15) that move when magnification is changed from the wide angle end to the telephoto end in the second embodiment. FIG. 13 corresponds to FIG. 5 showed in the first embodiment.

In the second embodiment, as in the first embodiment, the third lens group 130B and the fourth lens group 140B are constituted by a total of three lenses including one negative lens (eighth lens L28 included in the fourth lens group 140B) and two positive lenses. As shown in FIG. 11, the negative lens L28 included in the third lens group 130B and the fourth lens group 140B have an refractive index Nd16=1.92286 and an Abbe number vd16=18.9. When a negative lens is included in the fourth lens group 140B, this negative lens will preferably have a refractive index nd=1.8 or greater and Abbe number vd=25 or less, more preferably a refractive index nd=1.9 or greater and an Abbe number vd=20 or less.

FIG. 14 shows the optical specifications for the second embodiment. As shown in FIG. 14, at the wide angle end, the focal distance=3.90, the field angle 2ω=80.6 degrees, and the F number=2.81; at middle position, the focal distance=8.78, the field angle 2ω=39.8 degrees, and the F number is 3.02; and at the telephoto end, the focal distance=20.07, the field angle 2ω=18.0 degrees, and the F number=3.19. In this way, it is possible for the zoom lens 100B of the second embodiment to provide a wide field angle of field angle 80.6 degrees at the wide angle end.

B-3. Zoom Lens Characteristics:

FIGS. 15 to 17 show the aberration characteristics of the zoom lens 100B. FIG. 15 shows the aberration characteristics at the wide angle end in the second embodiment. FIG. 16 shows the aberration characteristics at middle position between the wide angle end and the telephoto end in the second embodiment. FIG. 17 shows the aberration characteristics at the telephoto end in the second embodiment. FIG. 15, FIG. 16, and FIG. 17 correspond to FIG. 7, FIG. 8, and FIG. 9 showed in the first embodiment.

As shown in FIG. 15 to FIG. 17, the zoom lens 100B of the second embodiment, like the zoom lens 100 of the first embodiment, at a high magnification ratio of 5× or greater affords, throughout from the wide angle end to the telephoto end, significantly improved spherical aberration, astigmatism, and distortion as compared with the aberration characteristics of a conventional zoom lens. Specifically, distortion is approximately 3% or less and is reduced to the point that distortion is virtually undetectable by the user. Therefore, it is possible to capture a high quality image throughout the entire field angle.

By virtue of the characteristic constitution described above, in the zoom lens 100B of the embodiment 2, at a high magnification ratio of 5× or greater it is possible to achieve a wide field angle which at the wide angle end exceeds a field angle of approximately 78 degrees; and to provide a high performance compact zoom lens whose aberration is held to 3% or less.

C. Third Embodiment

Figure 18:
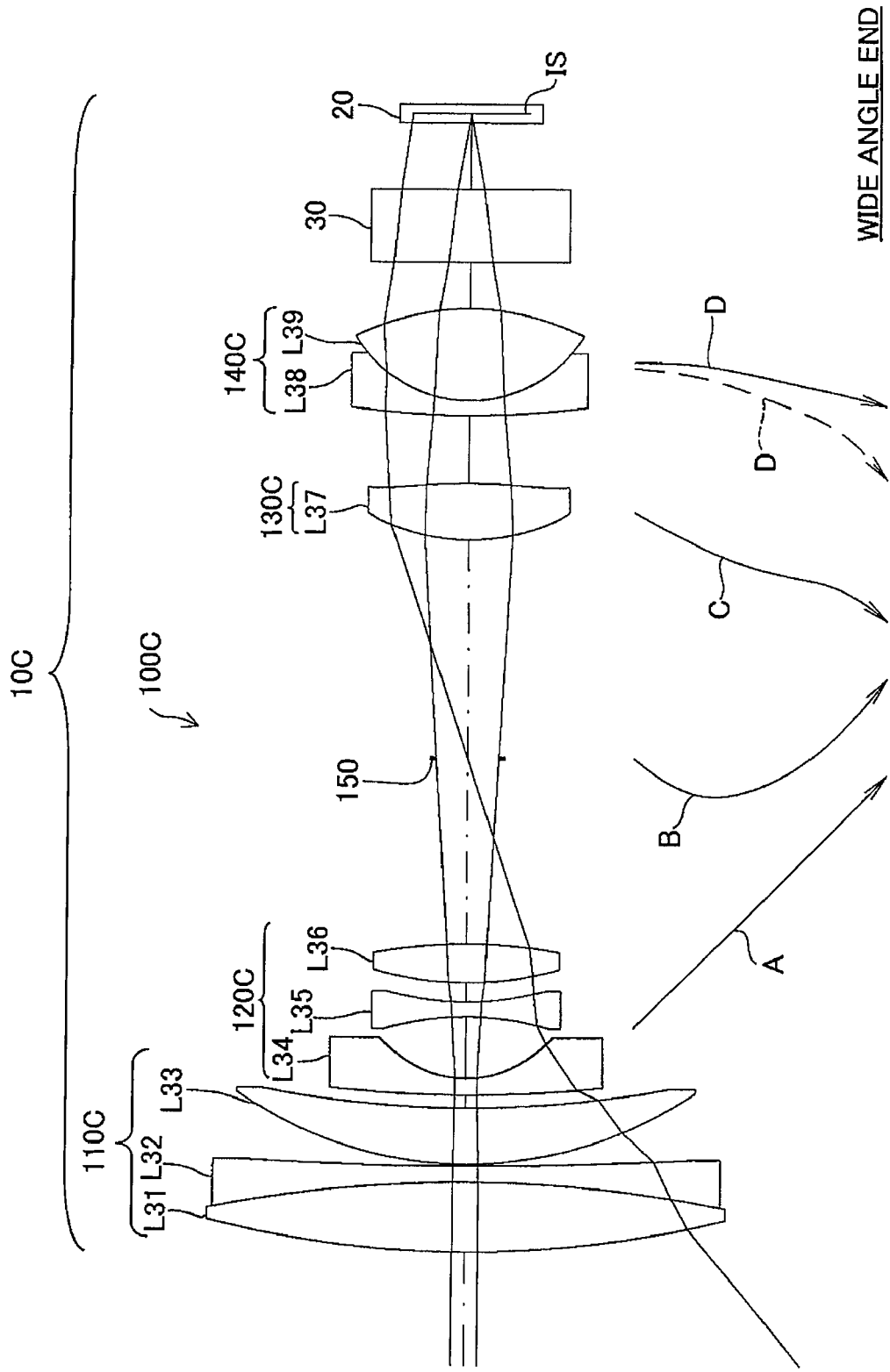
FIG. 18 shows the principal parts of the imaging device 10C in third embodiment.

C-1. Zoom Lens Constitution:

FIG. 18 shows the main parts of the imaging device 10C in the third embodiment. The imaging device 10C has substantially identical constitution as the imaging device 10 of the first embodiment, apart from the constitution of the zoom lens 100C.

The zoom lens 100C includes, in order from the object side, a first lens group 110C having an overall positive refractive power; a second lens group 120C that moves along the optical axis during changing magnification and having an overall negative refractive power; a third lens group 130C that moves on the optical axis during changing magnification and having an overall positive refractive power; a fourth lens group 140C that moves on the optical axis in order to correct the image surface position, and having an overall positive refractive power; and an aperture 150 that moves in a convex trajectory on the optical axis during changing magnification. The first lens group 110 is fixed.

The first lens group 110C is constituted by three lenses. The first lens L31 arranged furthest towards the object side is a biconvex lens. The second lens L32, which is the second lens when viewed from the object side, is a negative lens whose concave surface faces towards the object side. The third lens L33 is a positive meniscus lens whose convex surface faces towards the object side. As shown in FIG. 18, in contrast to the first lens group 110 of the first embodiment and the first lens group 110B of the second embodiment, in the first lens group 110C of the third embodiment the positive lens, the negative lens, and the positive lens are arranged in order from the object side.

The second lens group 120C is constituted by three lenses. The fourth lens L34 arranged at the furthest the object side is a negative meniscus lens whose concave surface is an aspheric surface facing towards the image side. The fifth lens L35, which is the second lens when viewed from the object side, is a biconcave lens. The sixth lens L36 arranged at the furthest image side is a biconvex lens.

The third lens group 130C is constituted by a single lens. The seventh lens L37 as the single lens is a biconvex lens whose surfaces on both the object side and the image side are formed with aspheric shape.

The fourth lens group 140C is constituted by two lenses. The eighth lens L38 arranged at the furthest object side is a negative meniscus lens whose concave surface faces towards the image side. The ninth lens L39, which is the final lens (final lens of the overall zoom lens 100C) situated at the furthest image side, is a biconvex lens whose surface on the image side is formed with an aspheric surface shape. The eighth lens L8 and the ninth lens L9 are cemented together to constitute a cemented lens.

The movement trajectories on the optical axis of the second lens group 120C, the aperture 150, the third lens group 130C, and the fourth lens group 140C during changing magnification are respectively denoted as trajectories A, B, C, and D in FIG. 18. As shown by the trajectory C, the aperture 150, after moving from the image side to the object side, moves from the object side to the image side.

Also, as shown by the trajectory C, the third lens group 130C moves on the optical axis independently during changing magnification.

C-2. Lens Data:

FIG. 19 shows surface data of the lenses that constitute the zoom lens 100C in the third embodiment. FIG. 19 corresponds to FIG. 3 illustrating the first embodiment. In this embodiment, the image side surface S7 of fourth lens L34, both surfaces S13 and S14 of the seventh lens L37, and the image side surface S17 of the ninth lens L39 are formed with aspheric surface shape. FIG. 20 shows the aspheric surface coefficients of the surfaces S7, S13, S14, and S17 in the third embodiment. FIG. 20 corresponds to FIG. 4 showed in the first embodiment. FIG. 21 shows values of the surface intervals D5, D11, D12, and D14 for the surfaces (surfaces with surface numbers 5, 11, 12, and 14) that move when magnification changes from the wide angle end to the telephoto end in the third embodiment. FIG. 21 corresponds to FIG. 5 showed in the first embodiment.

In the third embodiment, as in the first embodiment, the third lens group 130C and the fourth lens group 140C are constituted by a total of three lenses including one negative lens (the eighth lens L8 included in the fourth lens group 140C) and two positive lenses. As shown in FIG. 19, the negative lens L38 has a refractive index Nd15=1.84666 and an Abbe number vd15=23.8. Where the fourth lens group 140C contains a negative lens, the negative lens will preferably have a refractive index nd=1.8 or greater and an Abbe number v d=25 or less, more preferably a refractive index nd=1.9 or greater and an Abbe number v d=20 or less.

FIG. 22 shows the optical specifications in the third embodiment. As shown in FIG. 22, at the wide angle end, the focal distance=4.01, the field angle 2ω=78.4, and F number=2.82; at middle position, the focal distance=9.01, the field angle 2ω=38.2, and F number=3.03; and at the telephoto end, the focal distance=20.53, the field angle 2ω=17.2, and F number=3.21. In this way, the zoom lens 100C of the third embodiment affords a wide field angle of 78.4 degrees at the wide angle end.

Figure 23:
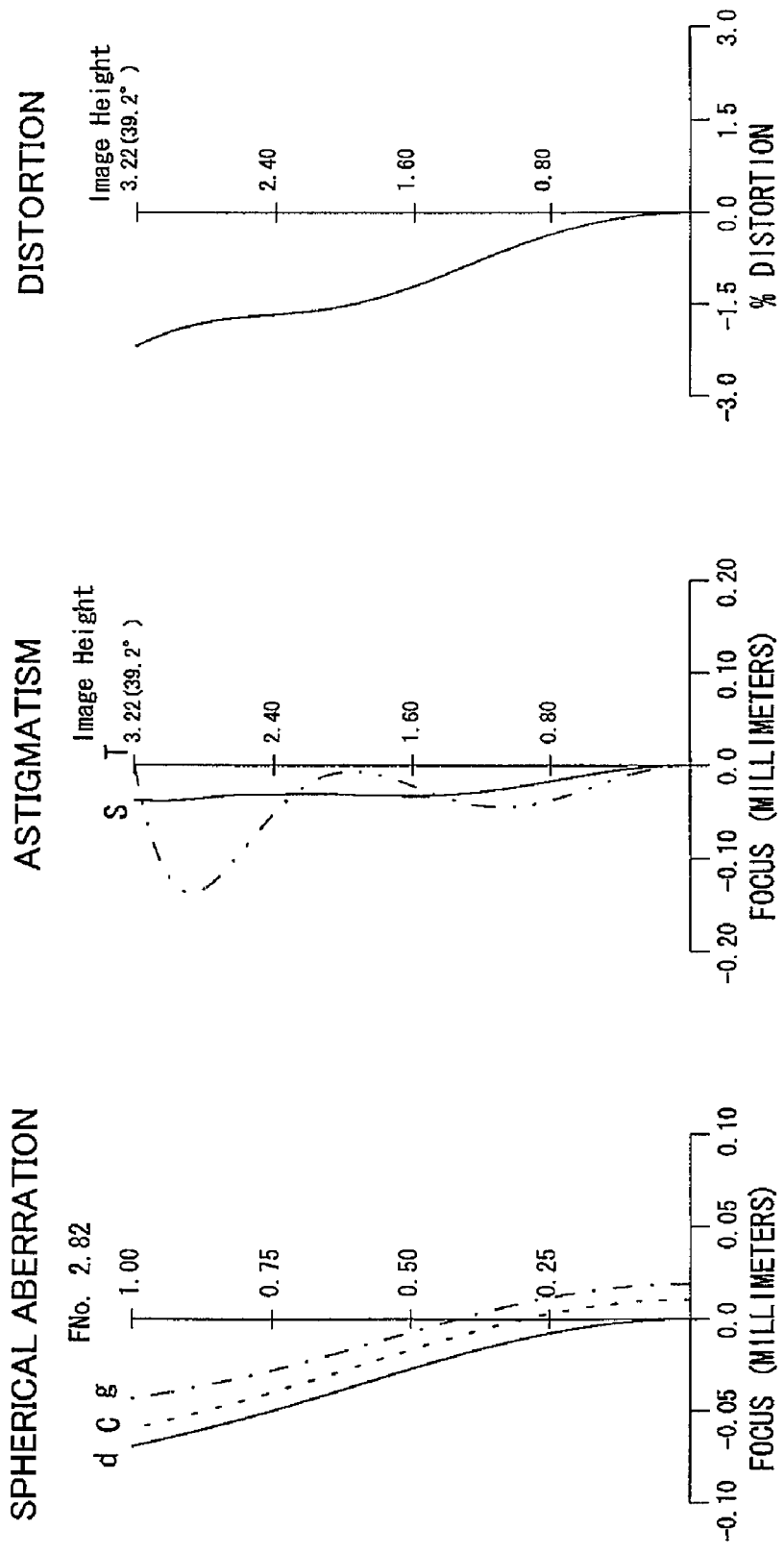
FIG. 23 shows the aberration characteristics at the wide angle end in third embodiment.
Figure 24:
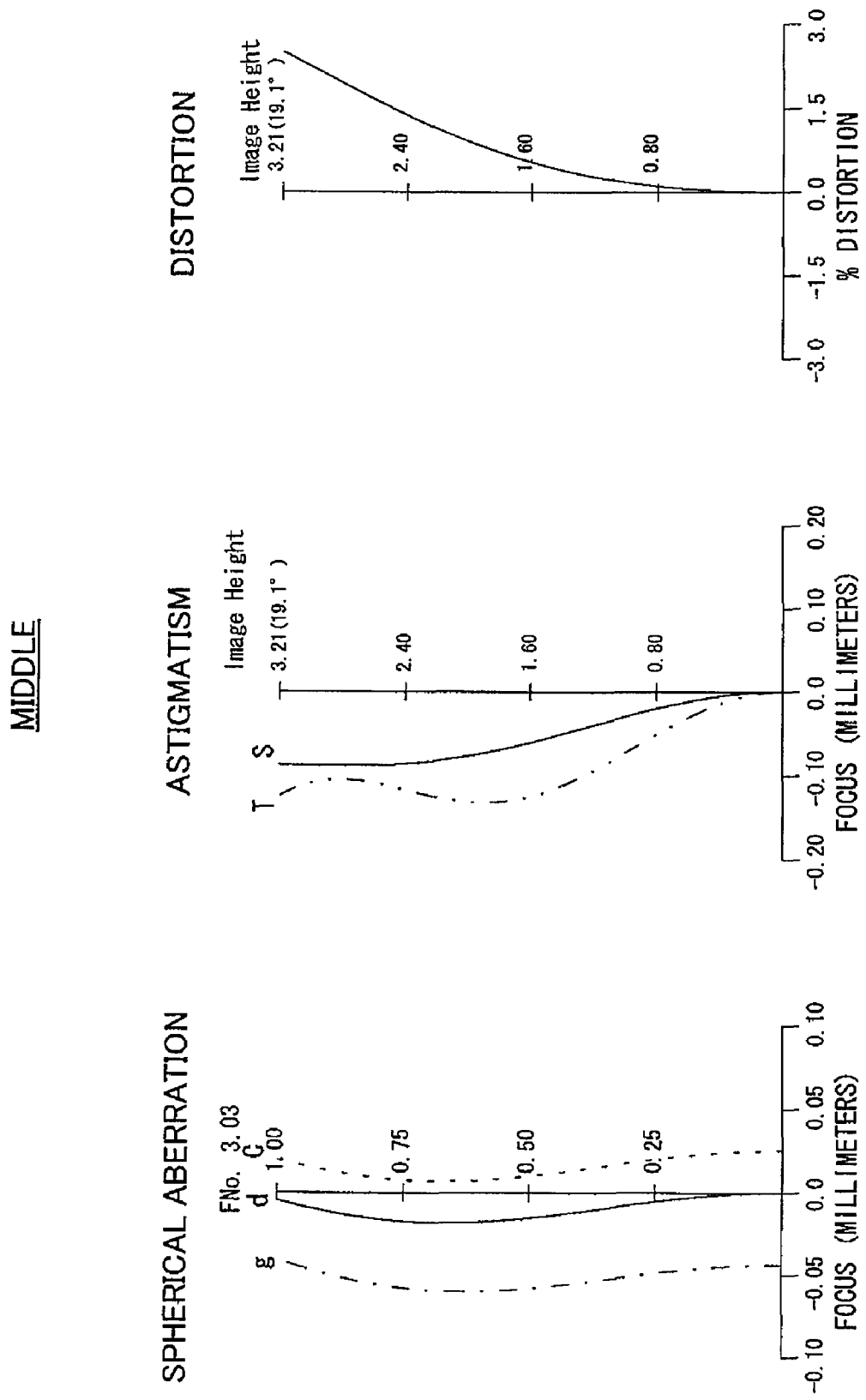
FIG. 24 shows the aberration characteristics at middle position between the wide angle end and the telephoto end in third embodiment.
Figure 25:
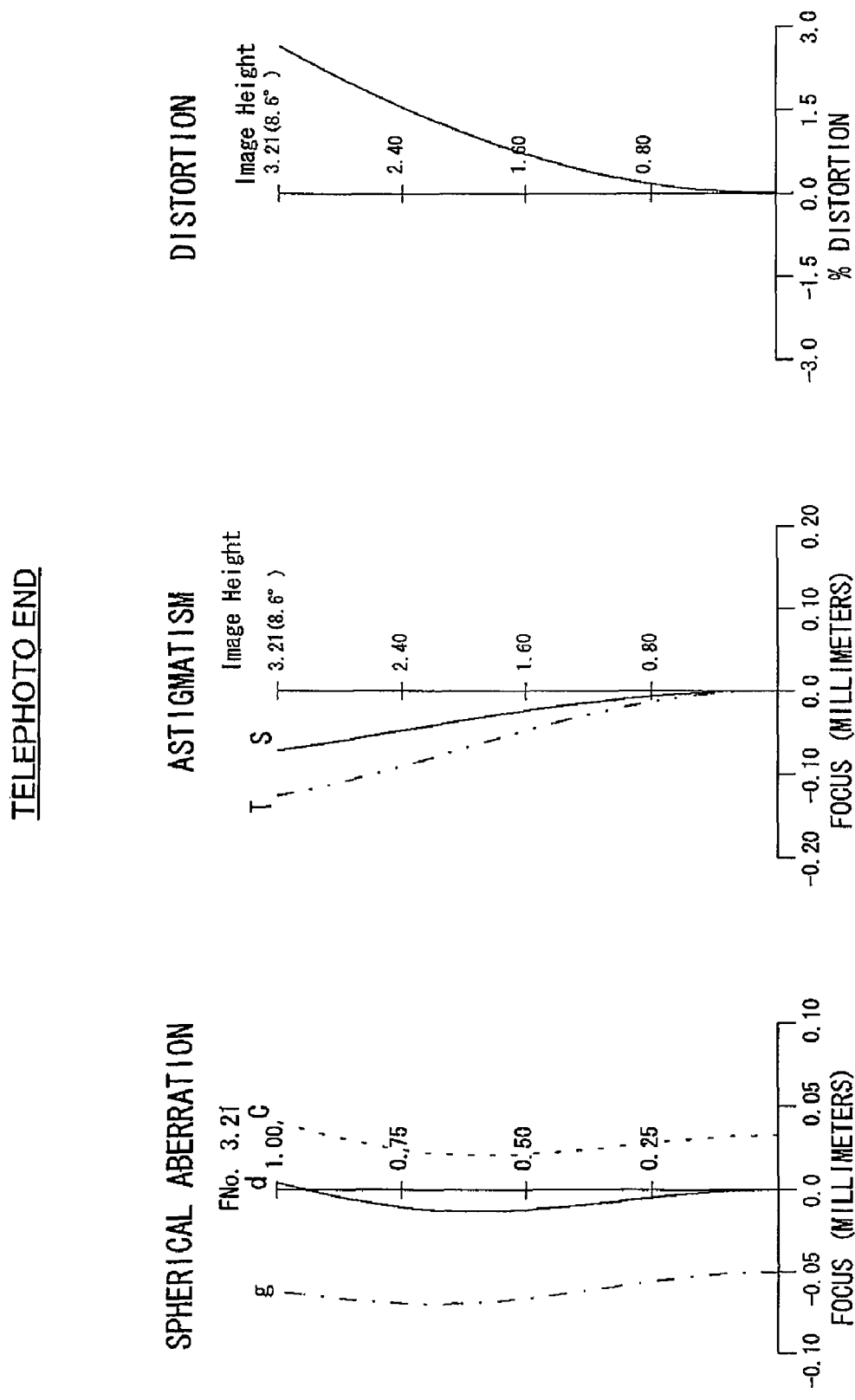
FIG. 25 shows the aberration characteristics at the telephoto end in third embodiment.

C-3. Zoom Lens Characteristics:

FIG. 23 to FIG. 25 show the aberration characteristics of the zoom lens 100C in the third embodiment. FIG. 23 shows the aberration characteristics at the wide angle end in the third embodiment. FIG. 24 shows the aberration characteristics at middle position between the wide angle end and the telephoto end in the third embodiment. FIG. 25 shows the aberration characteristics at the telephoto end in the third embodiment. FIG. 23, FIG. 24, and FIG. 25 correspond to FIG. 7, FIG. 8, and FIG. 9 showed in the first embodiment.

As shown in FIG. 23 to FIG. 25, in the zoom lens 100C of the third embodiment, as with the zoom lens 100 of the first embodiment, at a high magnification ratio of 5× or greater, there is significant improvement in spherical aberration, astigmatism, and distortion at the wide angle end and at the telephoto end, as compared to the aberration characteristics of a conventional zoom lens. In particular, distortion is approximately 3% or less, and is reduced to the point that distortion is virtually undetectable by the user. Therefore, it is possible to capture a high quality image throughout the entire field angle.

By virtue of the characteristic constitution described above, the zoom lens 100C of the third embodiment, even at a high magnification ratio of 5× or greater, affords a wide field angle exceeding approximately 78 degrees at the wide angle end, and affords a high performance compact zoom lens whose distortion is held to 3% or less.

D. Modification Example (1) In Embodiments 1 to 3 described above, the third lens group is constituted by a single lens, the fourth lens group is constituted by two lenses, and the third lens group and the fourth lens group together are constituted by three lenses; however, it is also possible for example for the third lens group to, be constituted by two lenses, and for the fourth lens group to be constituted by a single lens. In this case, for example the third lens group can be constituted by one positive lens and one negative lens, and the fourth lens group can be constituted by one positive lens. The negative lens contained in the third lens group will preferably have a refractive index Nd=1.8 or greater and an Abbe number vd=25 or less, and more preferably such that it has a refractive index Nd=1.9 or greater and an Abbe number vd=20 or less.

(2) In the embodiments described above, the zoom lens is implemented in an imaging device such as an document camera, a surveillance camera, a digital still camera or the like, but is the lens could instead be implemented in an imaging device such as a projector or the like.

Although the present invention has been described and showed in detail, it is clearly understood that the same is by way of illustration and example only and is not to be taken by way of limitation, the spirit and scope of the present invention being limited only by the terms of the appended claims.

What is claimed is:

1. A zoom lens comprising:
   a first lens group that is arranged at the farthest object side and has positive refractive power;
   a second lens group that is arranged at an image side of the first lens group and has negative refractive power and includes at least one aspheric surface;
   an aperture that is arranged at the image side of the second lens group;
   a third lens group that is arranged at the image side of the aperture and has positive refractive power;
   a fourth lens group that is arranged at the farthest image side, has positive refractive power, and moves for focusing; and
   a variable power mechanism that moves the second lens group, the third lens group, the aperture, and the fourth lens group respectively and independently during changing magnification;
   wherein
   the third lens group consists of one negative lens and one positive lens, and
   the fourth lens group consists of one positive lens.

2. A zoom lens in accordance with claim 1, wherein the negative lens included in the third lens group is such that refractive index is approximately 1.8 or greater and the Abbe number is approximately 25 or less.

3. A zoom lens in accordance with claim 1, wherein during changing magnification from the wide angle to the telephoto, the variable power mechanism moves the trajectory of the aperture from the image side to the object side, and then from the object side to the image side.

4. A zoom lens in accordance with claim 3, wherein during changing magnification from the wide angle to the telephoto, the variable power mechanism moves the second lens group monotonically from the object side to the image side, and moves the third lens group and the fourth lens group monotonically from the image side to the object side.

5. A zoom lens in accordance with claim 1, wherein during changing magnification from the wide angle to the telephoto, the variable power mechanism moves the second lens group monotonically from the object side to the image side, and moves the third lens group and the fourth lens group monotonically from the image side to the object side.

6. A zoom lens in accordance with claim 1, wherein the first lens group consists of one negative lens and two positive lenses.

7. A zoom lens in accordance with claim 1, wherein the first lens group is fixed.

* * * * *